US008886824B2

(12) United States Patent
Coulombe et al.

(10) Patent No.: US 8,886,824 B2
(45) Date of Patent: Nov. 11, 2014

(54) MEDIA ADAPTATION DETERMINATION FOR WIRELESS TERMINALS

(75) Inventors: Stephane Coulombe, Irving, TX (US); Umesh Chandra, Allen, TX (US)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 1167 days.

(21) Appl. No.: 10/765,576

(22) Filed: Jan. 26, 2004

(65) Prior Publication Data
US 2005/0165913 A1    Jul. 28, 2005

(51) Int. Cl.
| | |
|---|---|
| G06F 15/16 | (2006.01) |
| H04W 4/18 | (2009.01) |
| H04W 88/18 | (2009.01) |
| H04L 12/58 | (2006.01) |

(52) U.S. Cl.
CPC ......... H04L 12/5835 (2013.01); *H04W 88/184* (2013.01); *H04L 51/04* (2013.01); H04W 4/18 (2013.01); H04L 51/066 (2013.01); *H04L 12/581* (2013.01); *H04L 12/5895* (2013.01)
USPC ........... 709/232; 709/202; 709/203; 709/217; 709/231; 709/235; 709/246

(58) Field of Classification Search
USPC ......... 709/202, 203, 219, 231, 232, 247, 206, 709/207, 230, 248, 228, 246, 205, 204, 217, 709/235
See application file for complete search history.

(56) References Cited

U.S. PATENT DOCUMENTS

| | | | |
|---|---|---|---|
| 5,457,499 A * | 10/1995 | Lim ............................. | 348/474 |
| 5,953,506 A * | 9/1999 | Kalra et al. .................. | 709/231 |
| 6,101,328 A * | 8/2000 | Bakshi et al. ................. | 717/170 |
| 6,215,774 B1 * | 4/2001 | Knauerhase et al. ......... | 370/252 |
| 6,343,313 B1 * | 1/2002 | Salesky et al. ................ | 709/204 |
| 6,345,279 B1 * | 2/2002 | Li et al. ....................... | 707/104.1 |
| 6,345,303 B1 * | 2/2002 | Knauerhase et al. ......... | 709/238 |
| 6,553,404 B2 * | 4/2003 | Stern ............................. | 709/203 |
| 6,594,693 B1 * | 7/2003 | Borwankar ................... | 709/219 |

(Continued)

FOREIGN PATENT DOCUMENTS

| | | | |
|---|---|---|---|
| DE | 10142270 | 8/2002 | |
| DE | 10142270 A1 | 8/2002 | ............. H04L 12/16 |

OTHER PUBLICATIONS

ITU-T Recommendation T.81: "Information technology; Digital compression and coding of continuous-tone still images: Requirements and guidelines".

(Continued)

*Primary Examiner* — Michael Y Won

(57) ABSTRACT

A method (and corresponding equipment) by which a multimedia message is sent from a sending terminal (21) via a messaging server (22)—such as a MMS Proxy-Relay in MMS or a SIP proxy server in SIP IM—to a receiving terminal (25) having limited multimedia capabilities, with the sending terminal (21) adapted to include a user agent (21a) for inserting, into the message, media characteristics of the message sufficient in detail to enable the messaging server (22) to determine whether the message should be transcoded based on actual or assumed multimedia capabilities of the receiving terminal (25), and with the messaging server (22) configured to read the media characteristics and decide whether the message should be transcoded based only on the inserted media characteristics and on actual or assumed multimedia capabilities of the receiving terminal (25). The media characteristics are advantageously inserted into the header of the message.

16 Claims, 3 Drawing Sheets

(56) References Cited

U.S. PATENT DOCUMENTS

| | | | |
|---|---|---|---|
| 6,842,768 B1* | 1/2005 | Shaffer et al. | 709/203 |
| 6,934,756 B2* | 8/2005 | Maes | 709/227 |
| 6,961,754 B2* | 11/2005 | Christopoulos et al. | 709/204 |
| 6,970,935 B1* | 11/2005 | Maes | 709/230 |
| 7,069,301 B2* | 6/2006 | Jerbi et al. | 709/206 |
| 7,124,166 B2* | 10/2006 | Brown | 709/204 |
| 7,133,925 B2* | 11/2006 | Mukherjee et al. | 709/231 |
| 7,155,530 B2* | 12/2006 | Bodin et al. | 709/231 |
| 7,159,039 B1* | 1/2007 | Hahn et al. | 709/246 |
| 7,181,538 B2* | 2/2007 | Tam et al. | 709/246 |
| 7,200,680 B2* | 4/2007 | Evans et al. | 709/246 |
| 7,266,611 B2* | 9/2007 | Jabri et al. | 709/231 |
| 2001/0047517 A1* | 11/2001 | Christopoulos et al. | 725/87 |
| 2001/0054109 A1* | 12/2001 | Sainomoto et al. | 709/238 |
| 2002/0049852 A1* | 4/2002 | Lee et al. | 709/231 |
| 2002/0107850 A1 | 8/2002 | Sugimoto et al. | |
| 2002/0138619 A1* | 9/2002 | Ramaley et al. | 709/226 |
| 2003/0018796 A1* | 1/2003 | Chou et al. | 709/231 |
| 2003/0061368 A1* | 3/2003 | Chaddha | 709/231 |
| 2003/0177255 A1* | 9/2003 | Yun | 709/231 |
| 2003/0187930 A1 | 10/2003 | Ghaffar et al. | 709/205 |
| 2003/0200337 A1* | 10/2003 | Jabri et al. | 709/246 |
| 2004/0057403 A1 | 3/2004 | Jerbi et al. | 370/329 |
| 2004/0083291 A1* | 4/2004 | Pessi et al. | 709/227 |
| 2004/0111476 A1* | 6/2004 | Trossen et al. | 709/206 |
| 2004/0117427 A1* | 6/2004 | Allen et al. | 709/200 |
| 2004/0255041 A1* | 12/2004 | Wen et al. | 709/231 |
| 2005/0064852 A1* | 3/2005 | Baldursson | 455/414.2 |
| 2005/0138123 A1* | 6/2005 | Yun et al. | 709/206 |
| 2006/0075040 A1* | 4/2006 | Chmaytelli | 709/206 |

OTHER PUBLICATIONS

CompuServe Incorporated: "GIF Graphics Interchange Format: A Standard defining a mechanism for the storage and transmission of raster-based graphics information", Columbus, OH, USA, 1987.

Compuserve Incorporated, Columbus, Ohio (1990): "Graphics Interchange Format (Version 89a)".

"Transparent end-to-end Packet-switched Streaming Service (PSS); Protocols and codecs", Third Generation Partnership Project, 3GPP TS 26.234, Rel 4 (Mar. 2001). URL: http://www.3gpp.

"Transparent end-to-end Packet-switched Streaming Service (PSS); Protocols and codecs", Third Generation Partnership Project, 3GPP TS 26.234, Rel 5 (Mar. 2002). URL: http://www.3gpp.

"Multimedia Messaging Service: Service aspects; Stage 1," 3rd Generation Partnership Project TS 22.140:5.3.0 Release 5 (Sep. 2003). http://www.3gpp.org/ftp/Specs.

"Multimedia Messaging Service: Functional description; Stage 2," 3rd Generation Partnership Project TS 23.140:5.4.0 Release 5 (Sep. 2002). http://www.3gpp.org/ftp/Specs.

"Multimedia Messaging Service: Media Formats and Codecs," 3rd Generation Partnership Project TS 26.140:5.1.0 Release 5 (Jun. 2002). http://www.3gpp.org/ftp/Specs.

ftp://ftp.rfc-editor.org/in-notes/rfc3555.txt; S. Casner, Mime Type Registration of RTP Payload Formats, Jul. 2003.

ftp://ftp.rfc-editor.org/in-notes/rfc3016.txt; Y. Kikuchi, RTP Payload Format for MPEG-4 Audio/Visual, Nov. 2000.

ftp://ftp.rfc-editor.org/in-notes/rfc2045.txt; N. Freed, Internet Message Bodies, Nov. 1996.

ftp://ftp.rfc-editor.org/in-notes/rfc2912.txt; G. Klyne, Indicating Media Features for MIME Content, Sep. 2000.

Open Mobile Alliance (OMA) MMS Conformance Document, Version 1.2, OMA-MMS-CONF-v1_2-20030612-D, 2002 (as published on the Internet).

Network Working Group Request for Comments: 3555, Category: Standard Tracks, S. Casner Packet Design, P. Hoschka, W3C/INRIA/MIT, Jul. 2003, MIME Type Registration of RTP Payload Formats (as published on the Internet).

Open Mobile Alliance (OMA), Multimedia Messaging Service Client Transactions Version 1.2, Candidate Version Jul. 16, 2003, OMA-MMS-CTR-v1_2-20030716-C, 2003 (as published on the Internet).

English-translated abstract for DE10142270A1.

IETF Standard-Working-Draft, Internet Engineering Task Force; Gellens; "The Codecs Parameter for 'Bucket' Media Types"; pp. 1-10; Jun. 1, 2004; XP015013521.

IETF Standard-Working-Draft, Internet Engineering Task Force; Coulombe; "New Media Feature Tags for Indicating User Agent Capabilities" Message Size and Visual Media Resolution; draft-coulombe-media-tags-size-resolution-00; pp. 1-12; Oct. 1, 2003; XP015011990.

9 pages of a European Office Action dated Apr. 8, 2009.

"New Media Feature Tags for Indicating User Agent Capabilities: Message Size and Visual Media Resolution" <draft-coulombe-media-tags-size-resolution-00.txt> Coulome, Chandra, Pessi—Nokia; IETF Standard-Working Draft; Internet Engineering Task Force, IETF Oct. 2003; pp. 1-12.

12 Pages DE10142270 English Translation.

\* cited by examiner

MEDIA ADAPTATION DETERMINATION FOR WIRELESS TERMINALS

TECHNICAL FIELD

The invention relates to the field of media adaptation in Multimedia Messaging Service (MMS) and SIP (Session Initiation Protocol) Instant Messaging (IM) to enable interoperability. More particularly, the present invention pertains to using signaling to determine whether media adaptation (transcoding) for a telecommunications terminal must be performed.

BACKGROUND ART

Terminals available for multimedia messaging and so-called instant messaging have different media and network capabilities (e.g. different media formats supported, different limitation in message size and image resolution, etc.). A messaging server, such as an MMS Proxy-Relay logical entity as defined in the Open Mobile Alliance (OMA) specifications of the Multimedia Messaging Service (MMS) or a SIP proxy in SIP IM, has no standard way of knowing in advance whether media adaptation—called here transcoding (to accommodate limited multimedia capabilities of the receiving terminal)—is needed or not when providing a multimedia message to a terminal. Today a server must analyze all components of a message in view of the capabilities of the terminal to which the message is being sent, which means that a message must be opened to determine its relevant media characteristics.

The relevant characteristics of a message include for example: image resolution, whether a JPEG (Joint Photographic Experts Group) is baseline or progressive, and the number of frames of a GIF (graphics interchange format) image. If the message has multiple components (for example multiple JPEG images or multiple images of different formats) then the server has to analyze all the components of the message. For some server implementations, such an analysis requires that for each media component, a processing component (e.g. a plugin) supporting the media type of the component be identified, and that the media component then be sent to the identified media processing component for analysis. In the simplest cases, the analysis can be performed by decoding only the beginning (e.g. header part) of the media component. Nevertheless, the analysis requires processing in respect to each media component and requires the presence of a processing component capable of the analysis. The performance penalty can be very high if the transcoding engine is located on a separate server (e.g. in case of one vendor providing the messaging server but opting to use a transcoding server provided by another vendor, as illustrated in FIG. 1).

Thus, it would be advantageous to have a mechanism by which a messaging server can determine whether transcoding/media adaptation is needed for a message intended for a terminal without having to (open and) examine each media component of the message.

DISCLOSURE OF THE INVENTION

Accordingly, in a first aspect of the invention, a method is provided by which a multimedia message is transcoded en route from a sending terminal via a messaging server to a receiving terminal having limited multimedia capabilities, so as to be suitable for reception and presentation by the receiving terminal, the method characterized by: a step in which a user agent of the sending terminal inserts, into the message, media characteristics of the message sufficient in detail to enable determining whether the message should be transcoded to accommodate multimedia capabilities of the receiving terminal; and a step in which the messaging server reads the media characteristics and decides whether the message should be transcoded based only on the inserted media characteristics and on actual or assumed multimedia capabilities of the receiving terminal.

In accord with the first aspect of the invention, the messaging server may send the message to a transcoding server if transcoding is needed, and the transcoding server may use the inserted media characteristics to itself decide if transcoding is needed.

Also in accord with the first aspect of the invention, the messaging server may send the message to a transcoding server if transcoding is needed, and the transcoding server may use the inserted media characteristics to itself decide which parts of the message need transcoding.

Also in accord with the first aspect of the invention, the messaging server may determine, from the inserted media characteristics, which parts of the message need transcoding and may send the message to a transcoding server if transcoding is needed for any message part, and may include in the message an indication of which parts of the message need transcoding.

Also in accord with the first aspect of the invention, the messaging server may determine, from the inserted media characteristics, which parts of the message need transcoding and may send only those message parts requiring transcoding to a transcoding server.

Also in accord with the first aspect of the invention, the method may be further characterized by: a step in which transcoding is performed based on the inserted media characteristics and the actual or assumed multimedia capabilities of the receiving terminal, without performing an analysis of the message to determine whether transcoding is needed. Further, in the step in which transcoding is performed, the transcoding may be performed without also performing even an analysis to determine which parts of the message need to be transcoded.

Also in accord with the first aspect of the invention, the user agent may insert the media characteristics into a field in the header of the message.

Also in accord with the first aspect of the invention, the user agent may insert the media characteristics into a header field in the body of the message.

Also in accord with the first aspect of the invention, the media characteristics may include image and video resolution, or number of frames and frame rate of visual content, or sampling rate of audio content.

A second aspect of the invention provides a sending terminal, adapted for sending a multimedia message via a messaging server to a receiving terminal having limited multimedia capabilities, the sending terminal characterized by: a user agent for inserting, into the message, media characteristics of the message sufficient in detail to enable the messaging terminal to determine whether the message should be transcoded based only on actual or assumed multimedia capabilities of the receiving terminal and the inserted media characteristics.

A third aspect of the invention provides a messaging server, enhanced for determining whether to transcode a multimedia message sent from a sending terminal to a receiving terminal having limited multimedia capabilities, the messaging server characterized by: a characteristics reader and analyzer, responsive to the message, for deciding whether the message should be transcoded based only on comparing media characteristics inserted into the message with actual or assumed multimedia capabilities of the receiving terminal.

A fourth aspect of the invention provides a system, comprising a sending terminal and a messaging server, both adapted to perform according to a method by which a multimedia message is transcoded en route from the sending terminal via the messaging server to a receiving terminal having limited multimedia capabilities, so as to be suitable for reception or presentation by the receiving terminal, the system characterized in that: the sending terminal includes a user agent for performing a step of inserting, into the message, media characteristics of the message sufficient in detail to enable determining whether the message should be transcoded to accommodate multimedia capabilities of the receiving terminal; and the messaging server includes means for performing a step of reading the media characteristics and deciding whether the message should be transcoded based only on the media characteristics and on actual or assumed multimedia capabilities of the receiving terminal.

In accord with the fourth aspect of the invention, the messaging server may also include or may have access to means for performing a step in which transcoding is performed based on the inserted media characteristics and the actual or assumed multimedia capabilities of the receiving terminal, without performing an analysis of the message to determine media characteristics of the message relevant to deciding whether transcoding is needed.

Also in accord with the fourth aspect of the invention, the system may also include a transcoding server, and may be further characterized in that the messaging server is configured to send the message to the transcoding server if transcoding is needed, and the transcoding server is configured to use the inserted media characteristics to itself decide if transcoding is needed.

Also in accord with the fourth aspect of the invention, the system may also include a transcoding server, and may be further characterized in that the messaging server is configured to send the message to the transcoding server if transcoding is needed, and the transcoding server is configured to use the inserted media characteristics to itself decide which parts of the message need transcoding.

Also in accord with the fourth aspect of the invention, the system may also include a transcoding server, and may be further characterized in that the messaging server is configured to determine, from the inserted media characteristics, which parts of the message need transcoding and to send the message to the transcoding server if transcoding is needed for any message part, and to include in the message an indication of which parts of the message need transcoding.

Also in accord with the fourth aspect of the invention, the system may also include a transcoding server, and may be further characterized in that the means for transcoding is performed based on the inserted media characteristics and the actual or assumed multimedia capabilities of the receiving terminal, without performing an analysis of the message to determine whether transcoding is needed.

In a fifth aspect of the invention, a computer program product is provided comprising: a computer readable storage structure embodying computer program code thereon for execution by a computer processor in a sending terminal, said computer program code characterized in that it includes instructions for performing the steps of a method according to the first aspect of the invention and indicated as being performed by the sending terminal.

In a sixth aspect of the invention, a computer program product is provided comprising: a computer readable storage structure embodying computer program code thereon for execution by a computer processor in a messaging server, said computer program code characterized in that it includes instructions for performing the steps of a method according to the first aspect of the invention and indicated as being performed by the messaging server.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

Figure 1:
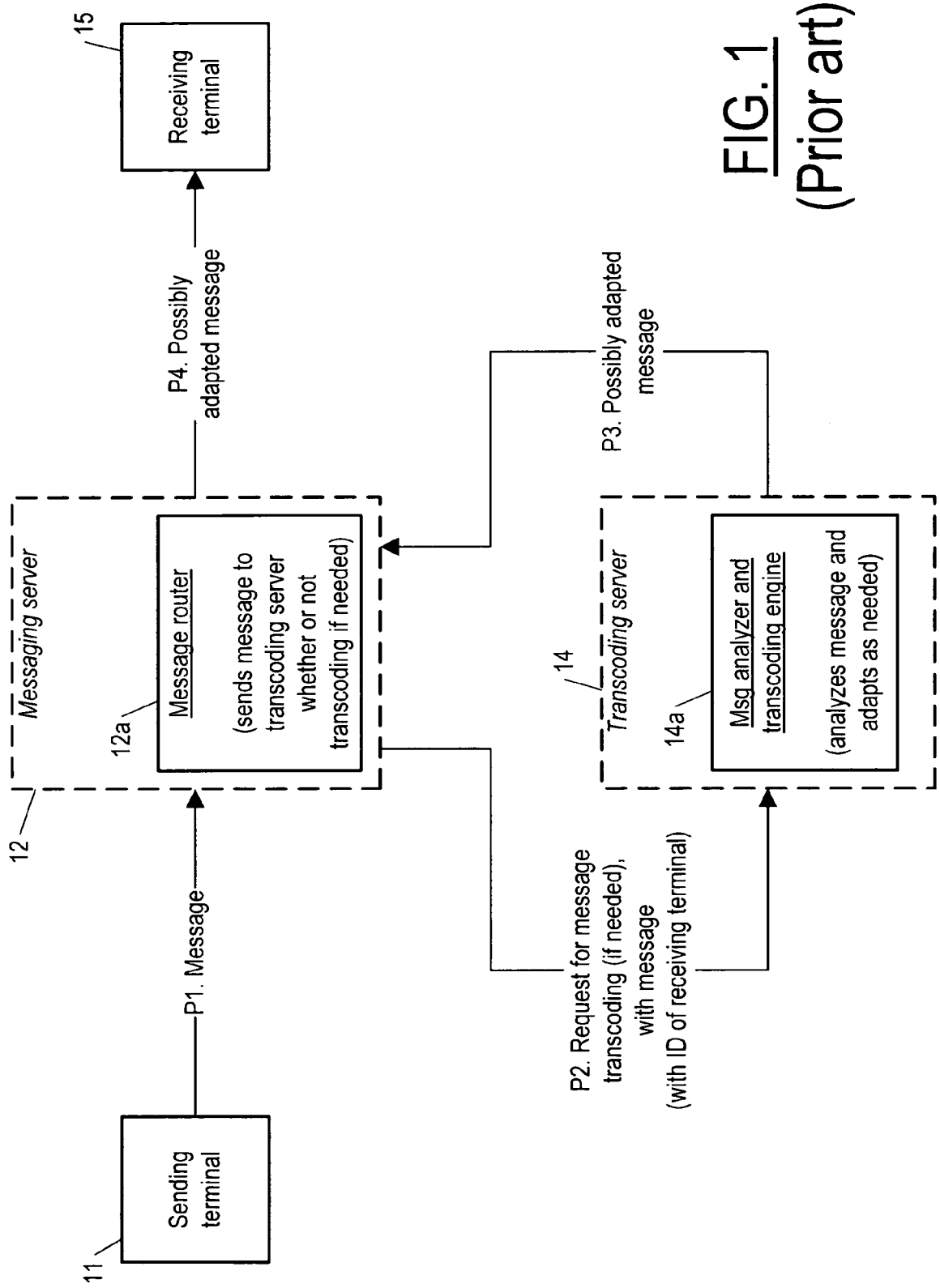
FIG. 1 is a block diagram/flow diagram of a messaging system including an external transcoding/adaptation server, according to the prior art.

According to the invention, in order to enable a messaging server (e.g. an MMS Proxy-Relay in MMS, or an SIP proxy in SIP IM) to determine whether transcoding/media adaptation is needed for a message intended for a receiving terminal, a user agent of the sending terminal inserts characteristics of each of the media components of the message into the message in a standard way (e.g. in the message header or body, according to a standard format). The messaging server examines only the inserted media characteristics information (like format profile, resolution, image-size, frame rate, etc) in deciding whether transcoding is necessary, and thus need not examine/open any other part of the message, making it possible to get by with less processing complexity for the messaging and transcoding servers, and yet providing a decision as to whether transcoding is necessary in less time (at least for more complex messages) than would be possible if the message had to be opened and examined in its entirety. Also, the messaging server can make a decision on transcoding without having knowledge of any given media format coding scheme (although it needs to know what media type and sometimes also what media format is being used for the message components); the messaging server operative according to the invention only needs to compare media characteristics with terminal capabilities (or adaptation targets).

The characteristics information inserted into the message by the user agent include, in addition to the usual MIME (Multipurpose Internet Mail Extensions) type information, more detailed information about the individual media components of the message such as: image resolution, and format profile (e.g. JPEG baseline or progressive, H.263 profile and level information). In e-mail, SIP messaging and MMS, because of MIME multipart usage, there are already some headers having associated fields in which corresponding information is conveyed. These headers provide some of the information of use in determining whether transcoding is necessary, headers such as the content-type header, which provides the MIME type of the message component, and the content-length header, which indicates the length of the message component. According to the invention, however, detailed characteristics such as image resolution, media profiles (JPEG baseline versus progressive, video profile and level), frame rate (for video clips), media contained in a MP4/3GPP/3GPP2 file format, and other comparable information are inserted in MIME multipart headers, for example in the content-type field of the content-type header. Such insertions enable a messaging server to know the media properties of the incoming message. For example if a SIP IM is sent carrying a JPEG image of resolution 480×320, the content-type header field could be:

Content-type: image/JPEG; media-pix-x=480; media-pix-y=320;profile=baseline;Content-ID=<img.jpg>.

Such a content-type header lets the messaging server know that the incoming message is of type JPEG baseline with a resolution of 480×320. If the terminal to which the message is intended is able to display only 160×120, then the messaging server knows from the inserted characteristics and without otherwise opening the message (i.e. without examining each media component of the message) that the message must be transcoded. It also knows which parts of the message needs to be transcoded and could decide to send only those parts for adaptation (either internally or to an external transcoding server).

Thus, and now referring to FIG. 1, according to the prior art a sending terminal 11 sends a message to a receiving terminal 15, and in the course of delivery the message is processed by a messaging server 12. The messaging server—and more specifically a message router 12a included as part of (i.e. in that it is hosted by) the messaging server 12—sends a request for adaptation to a transcoding server 14 including the message, along with the capabilities of the receiving terminal or its identity (e.g. User-Agent header). Given the identity of the receiving terminal, the transcoding server 14 is usually able to look up the capabilities of the receiving terminal using an internal terminal capability database. The transcoding server 14—and more specifically a message analyzer and transcoding engine 14a included as part of (hosted by) the transcoding server—then opens the message, examines each media component, and determines what if any transcoding is necessary, which it then performs. It then sends the possibly transcoded message back to the messaging server, which forwards it to the receiving terminal. (In some prior art, instead of the message router 12a, there is a message adapter that opens the message and analyzes each part to determine which parts need adaptation and then sends only those to the transcoding server 14.)

Figure 2:
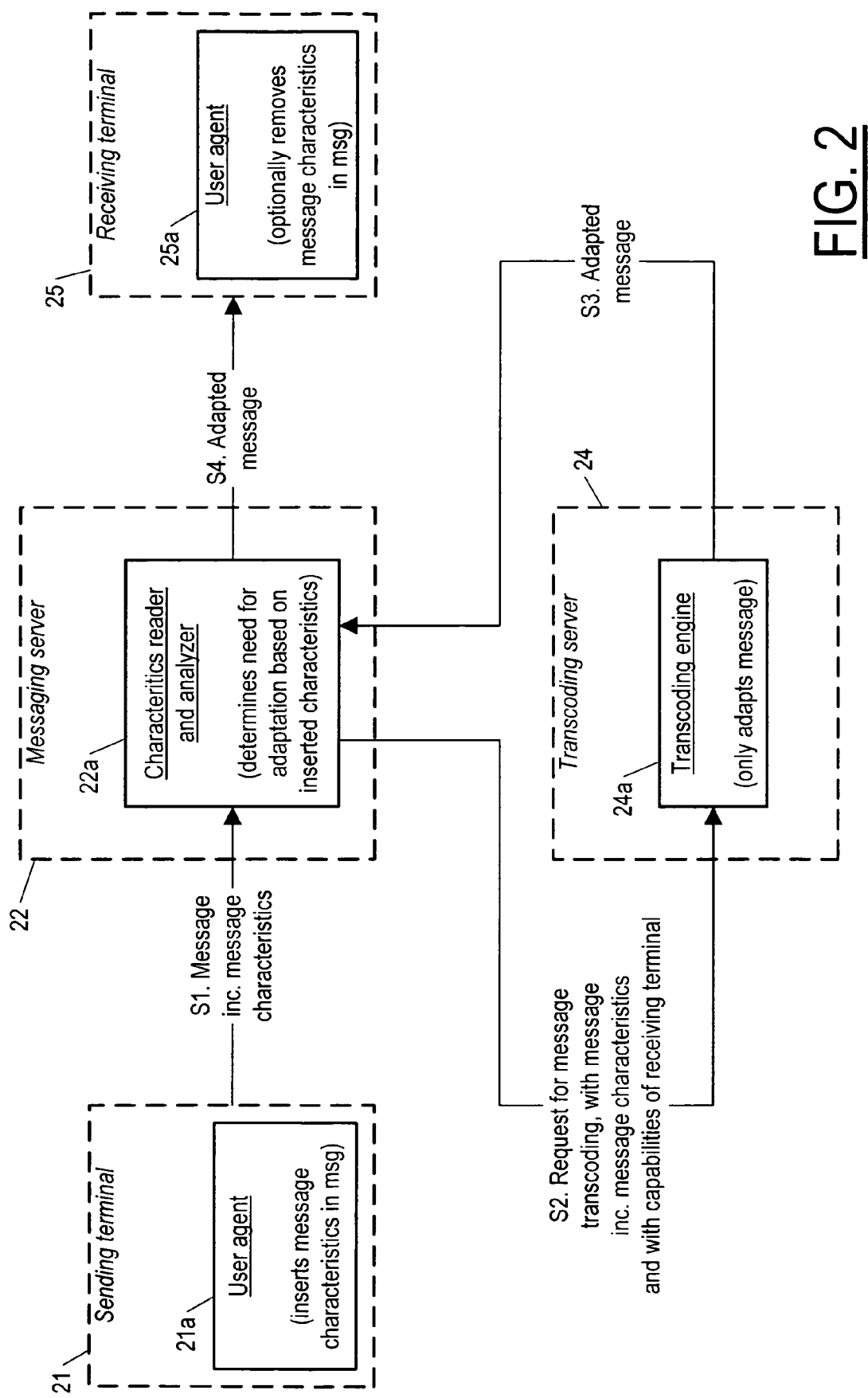
FIG. 2 is a block diagram/flow diagram of a messaging system including an external transcoding/adaptation server, according to the invention.

In contrast, and now referring to FIG. 2, according to the invention, a sending terminal 21 includes a user agent 21a that inserts into a message to be sent to the receiving terminal 25, according to one or another convention such as described below, media characteristics information about the message sufficient in detail to determine whether transcoding is needed, given the capabilities of the receiving terminal. The sending terminal then sends the message to the receiving terminal 25, and in the course of delivery the message is processed by a messaging server 22 according to the invention, i.e. a messaging server 22 including a characteristics reader and analyzer module 22a for determining whether there is a need for adaptation/transcoding of a message based on the media characteristics inserted into the message. Prior to message delivery to the receiving terminal 25, the messaging server 22 looks up the capabilities of the receiving terminal or somehow otherwise receives a specification of the capabilities, or else assumes (typically) some minimum set of multimedia capabilities, and then, using the characteristics reader and analyzer module 22a, the messaging server examines the inserted characteristics, and if transcoding is needed based on the actual or assumed multimedia capabilities of the receiving terminal 25, sends the message to a transcoding server 24 also according to the invention, i.e. the transcoding server would take into account the media characteristics information of the message when determining which components of the message require adaptation. The transcoding server can itself look up the capabilities of the receiving terminal or the messaging server can include the capabilities with the request for transcoding. In some embodiments, the transcoding server 24 will itself re-examine the message and determine the transcoding needed, just as in the prior art, so that what the invention accomplishes in such embodiments is to avoid having the messaging server 22 send a message to an external transcoding server 24 when transcoding is not needed. Also, since in such embodiments it is advantageous to have the messaging server be overly cautious in determining whether transcoding is needed, it is possible for the transcoding server 24 to decide that no transcoding is needed even though the messaging server has decided otherwise (such as e.g. if the message contains media components of a type the messaging server is not programmed to handle and therefore cannot determine whether the components are suitable for the receiving terminal without transcoding).

After transcoding (if needed), the transcoding server 24 sends the (possibly) transcoded message back to the messaging server, which forwards it to the receiving terminal.

Note that the transcoding engine 24a may actually be hosted by the messaging server 22, and not by a separate transcoding server, although for purposes of a more plain comparison with the prior art as illustrated in FIG. 1, the transcoding engine 24a is shown hosted by a separate transcoding server 24, operated typically by a party different than the party operating the messaging server 22.

In the course of transcoding, the transcoding server 24 advantageously modifies the message's media characteristics information, which it includes in the transcoded message it sends back to the messaging server 22. In some embodiments, however, the media characteristics information is stripped from the message. In such embodiments, if the receiving terminal 25 later forwards the message to another terminal, a user agent included in that terminal, acting now as a sender, inserts again message media characteristics information in the message determined by analysing the media components of the message. The messaging server 22 can also therefore behave differently in different embodiments: in some, it strips the inserted media characteristics information and in others it retains the inserted media characteristics information.

The media characteristics can advantageously all be inserted into one or more of the headers in the message header, rather than in the message body, in order to reduce the parsing time to extract such information.

Media Content Characteristics

In some embodiments, the media characteristics to be inserted into a message by a user agent can include the media content characteristics indicated in Table 1.

TABLE 1

Media content characteristics.

| Media content characteristic | Description | Media types to which it applies |
|---|---|---|
| Charset | Character set used (RFC 2045). Values include US-ASCII and ISO-8859-1. | Text content |
| Profile | Profile of the media component (e.g. Profile 0 for H.263 or baseline for JPEG). | All |
| Level | Level of the media component (e.g. Level 10 for H.263). | All |
| Media-pix-x | Horizontal resolution of the visual media component (e.g. 640 pixels). Note that for video, conformance can often be deduced from profile/level information but this media characteristic provides more detailed information and could be useful. | Visual content |
| Media-pix-y | Vertical resolution of the visual media component (e.g. 480 pixels). Note that for video, conformance can often be deduced from profile/level information but this media characteristic provides more detailed information and could be useful. | Visual content |
| Nb-frames | Number of frames in the visual media component (e.g. animated GIF or video clip). This is optional. | Visual content |
| Frame-rate | Frame-rate of the visual media component (e.g. 15 frames per seconds). | Visual content (e.g. video) |
| Sampling-rate | Sampling rate of the audio media component (e.g. 8000 Hz). This can also be implicit to the Content type. For instance audio/amr is 8000 Hz. | Audio content |
| Nb-channels | Number of channels of the media component (e.g. stereo is 2, mono is 1). This can also be implicit to the Content type. For instance audio/amr is mono. | All |
| Duration | Approximate duration of the media component in milliseconds (e.g. duration of an audio or video clip, or a presentation). This is typically optional. | All |
| Media-size | The size of the media component itself i.e. without MIME headers and encoding for transport (e.g. 5200 Bytes). | All |
| Content-subtype | The Content type of a media component embedded in a file format (e.g. video/H263-2000 and audio/AMR subtypes can be embedded in a video/3gpp file format). Subsequent content characteristics apply to this content-subtype (until a new content-subtype is listed). Content characteristics listed prior to all content-subtype apply to the Content-type itself as a whole. | File formats |
| Content-ID | Content-ID as described in RFC-2392 providing a reference to the body part to which the content description applies. | All |
| X-MMS-Content-Class | The list of Content Classes to which the Multimedia Message belongs to:<br>TX = Text, IB = Image basic, IR = Image rich, VB = Video basic, VR = Video rich.<br>E.g. TX, IB, IR.<br>This media content characteristic is typically located in the message header. | Multimedia Message |
| X-Content-Description | Description of the content present in the message body. The syntax is the same as for the Content-type characteristic. In the case of multipart content, a line containing the Content-Description for each part shall be provided. This media content characteristic is located in the message header. | Multimedia Message |

Table 2 describes content-specific values of profiles and level media content characteristics. For instance, Baseline and Progressive are acceptable JPEG profiles.

TABLE 2

Content-specific values of profile and level media content characteristics.

| Content-type | Profile | Description | Level | Description |
|---|---|---|---|---|
| Image/jpeg | Baseline | Baseline DCT, non-differential, Huffman coding, as defined in table B.1, symbol 'SOF0' in "MMS v1.2 Client Transactions," by the Open Mobile Alliance (OMA). | N/A | |
| | Progressive | Progressive DCT, non-differential, Huffman coding, as defined in table B.1, symbol 'SOF2' in "MMS v1.2 Client Transactions," by the Open Mobile Alliance (OMA). | N/A | |
| Video/h263-2000 | 0 through 10 (0 and 3 are typically used | H.263 profile number specifying the supported H.263 annexes/subparts. H.263 Baseline corresponds to Profile | 0-100 | Level of bitstream operation specifying the level of |

TABLE 2-continued

Content-specific values of profile and level media content characteristics.

| Content-type | Profile | Description | Level | Description |
|---|---|---|---|---|
| | for MMS) | 0, Level 10. (See RFC 3555.) | | computational complexity of the decoding process. H.263 Baseline corresponds to Profile 0, Level 10. (See RFC 3555.) |
| Application/smil | SMIL-CONF-1-2 | Indicates one or more base sets of SMIL modules that the client supports. "SMIL-CONF-1-2" identifies the SMIL base set and associated limitations defined in "MMS Conformance Document," version 2.0.0, February 2002, by CMG, Ericsson, Nokia, Sony-Ericsson, Comverse, Logica, Siemens, and Motorola; and in "MMS Conformance Document," version 1.1, August 2001, by Ericsson, Nokia. | | |
| | SMIL-3GPP-R4 | Predefined values for base sets defined in "Transparent end-to-end Packet-switched Streaming Service (PSS); Protocols and codecs," Third Generation Partnership Project, 3GPP TS 26.234, Rel 4. | | |
| | SMIL-3GPP-R5 | Predefined values for base sets defined in "Transparent end-to-end Packet-switched Streaming Service (PSS); Protocols and codecs," Third Generation Partnership Project, 3GPP TS 26.234, Rel 5. | | |

Table 3 describes MPEG-4 Visual Profile values of profile-level-id media content characteristic.

TABLE 3

Content-specific values of profile and level media content characteristics.

| Content-type | Profile-level-id | Description |
|---|---|---|
| Video/ mp4v-es | Decimal value (a value of 1 specifies MPEG-4 Visual Simple Profile Level 1) | A decimal representation of MPEG-4 Visual Profile and Level indication value (profile_and_level_indication) defined in Table G-1 of ISO/IEC 14496-2. See ISO/IEC 14496-2: 1999, "Information technology - Coding of audio-visual objects - Part2: Visual," and see ISO/IEC 14496-2: 1999/Amd.1: 2000, "Information technology - Coding of audio-visual objects - Part 2: Visual, Amendment 1: Visual extensions." |

Representation of Media Content Characteristics in Messages

The invention encompasses many ways to represent media content characteristics in a message. Among the many encompassed is an embodiment in which the media content characteristics are represented as parameters of the MIME content-type header field for the body parts specified in RFC 2045. In such an embodiment, the media content characteristics are part of the message body, and indicated in bold-italic in Message Fragment 1, which is an example of an MMS message after alteration (insertion of media characteristics) by the user agent in the sending terminal 21.

Message Fragment 1: Media content characteristics represented as parameters of the MIME content-type header field, i.e. as content-type parameters in message body.

```
MMS Headers
    X-Mms-Message-Type: M-send.req
    X-Mms-Transaction-ID: 0123456789
    X-Mms-MMS-Version: 1.3
    From: +123/TYPE=PLMN
    To: +456/TYPE=PLMN
    Subject: My holidays
    Content-type: application/vnd.wap.multipart.related;
    type = "application/smil";
    start = "<0000>";
```

```
Message Body
    Content-type: application/smil; profile=SMIL-3GPP-R5
    Content-ID: <0000>
    .... SMIL presentation file....
    Content-type: image/jpeg; media-pix-x=640; media-pix-y=480; profile=Baseline; media-
    size=32768
    Content-ID: <image1.jpg>
    .... jpeg-image....
    Content-type: text/plain; charset="us-ascii"; media-size=512
    Content-ID: <text.txt>
    .... text....
    Content-type: audio/amr; media-size=5000
    Content-ID: <audio.amr>
    .... audio....
    Content-type: video/3gpp; media-size=44000;Duration=10000; Content-
    subtype=video/h263-2000; Profile=0; level=10; Frame-rate=15; media-size=40000;
    Content-subtype=audio/amr; media-size=4000
    Content-ID: <video.3gp>
    .... audio+video clip....
```

In another embodiment, the media content characteristics are represented as parameters of the proposed content-description header field part of the message header. This is illustrated in Message Fragment 2. This method has the advantage that one doesn't need to parse through the message body to extract the relevant information which can improve performance furthermore. Also, it allows global description of the content. For instance, it allows indicating to which MMS message classes the message belongs to (see X-Mms-Content-Class descriptor). The content description is linked to the body part through the use of the Content-ID parameter.

Message Fragment 2: Example of MMS message with media characteristics as content-description parameters in message header.

```
MMS Headers
    X-Mms-Message-Type: M-send.req
    X-Mms-Transaction-ID: 0123456789
    X-Mms-MMS-Version: 1.3
    From: +123/TYPE=PLMN
    To: +456/TYPE=PLMN
    Subject: My holidays
    Content-type: application/vnd.wap.multipart.related;
    type = "application/smil";
    start = "<0000>";
    X-Mms-Content-Class ="VB,VR"
    X-Content-Description: application/smil; profile=SMIL-3GPP-R5; Content-ID=<0000>
    X-Content-Description: image/jpeg; media-pix-x=640; media-pix-y=480; profile=Baseline;
    media-size=32768; Content-ID=<image1.jpg>
    X-Content-Description: text/plain; charset="us-ascii"; media-size=512;Content-
    ID=<text.txt>
    X-Content-Description: audio/amr; media-size=5000;Content-ID=<audio.amr>
    X-Content-Description: video/3gpp; media-size=44000; Duration=10000; Content-
    subtype=video/h263-2000; Profile=0; level=10; Frame-rate=15; media-size=40000;
    Content-subtype=audio/amr; media-size=4000; Content-ID=<video.3gp>
Message Body
    Content-type: application/smil
    Content-ID: <0000>
    .... SMIL presentation file....
    Content-type: image/jpeg
    Content-ID: <image1.jpg>
    .... jpeg-image....
    Content-type: text/plain; charset="us-ascii"
    Content-ID: <text.txt>
    .... text....
    Content-type: audio/amr
    Content-ID: <audio.amr>
    .... audio....
    Content-type: video/3gpp
    Content-ID: <video.3gp>
    .... audio+video clip....
```

An essentially equivalent embodiment is one in which the media characteristics are represented using the content-features header in a manner described in RFC 2912, as shown in Message Fragment 3.

Message Fragment 3: Example of MMS message with media characteristics as content-feature parameters in message body.

```
MMS Headers
    X-Mms-Message-Type: M-send.req
    X-Mms-Transaction-ID: 0123456789
    X-Mms-MMS-Version: 1.3
    From: +123/TYPE=PLMN
    To: +456/TYPE=PLMN
    Subject: My holidays
    Content-type: application/vnd.wap.multipart.related;
    type = "application/smil";
    start = "<0000>";
Message Body
    Content-type: application/smil
    Content-features: (profile=SMIL-3GPP-R5)
    Content-ID: <0000>
    .... SMIL presentation file....
    Content-type: image/jpeg
    Content-features: ( & (media-pix-x=640)(media-pix-y=480) (profile=Baseline)(media-
    size=32768) )
    Content-ID: <image1.jpg>
    .... jpeg-image....
    Content-type: text/plain; charset="us-ascii"
    Content-features: (media-size=512)
    Content-ID: <text.txt>
    .... text....
    Content-type: audio/amr
    Content-features: (media-size=5000)
    Content-ID: <audio.amr>
    .... audio....
    Content-type: video/3gpp
    Content-features: (& (media-size=44000)(Duration=10000)
        (& (Content-subtype=video/h263-2000)(Profile=0)(level=10)(Frame-
    rate=15)(media-size=40000))
        (& (Content-subtype=audio/amr)(media-size=4000) ) )
    Content-ID: <video.3gp>
    .... audio+video clip....
    .... audio....
    Content-type: video/3gpp
    Content-features: (& (media-size=44000)(Duration=10000)
        (& (Content-subtype=video/h263-2000)(Profile=0)(level=10)(Frame-
    rate=15)(media-size=40000))
        (& (Content-subtype=audio/amr)(media-size=4000) ) )
    Content-ID: <video.3gp>
    .... audio+video clip....
```

Another possibility is to have the media content characteristics be represented as parameters of the content-features as part of the message header, as indicated in Message Fragment 4. This method has the advantage that one doesn't need to parse through the message body to extract the relevant information which can improve performance furthermore. Also, it allows global description of the content. For instance, it allows indicating to which MMS message classes the message belongs to (see X-Mms-Content-Class descriptor).

Message Fragment 4: Example of MMS message with media characteristics as content-feature parameters in message header.

```
MMS Headers
    X-Mms-Message-Type: M-send.req
    X-Mms-Transaction-ID: 0123456789
    X-Mms-MMS-Version: 1.3
    From: +123/TYPE=PLMN
    To: +456/TYPE=PLMN
    Subject: My holidays
    Content-type: application/vnd.wap.multipart.related;
    type = "application/smil";
    start = "<0000>";
    Content-features: ( & (Type= "application/smil")(profile=SMIL-3GPP-R5) (Content-
    ID=<0000>))
    Content-features: ( & (Type= "image/jpeg")(media-pix-x=640)(media-pix-y=480)
    (profile=Baseline)(media-size=32768) (Content-ID=<image1.jpg>))
    Content-features: ( & (Type= "text/plain")(charset=us-ascii)(media-size=512)( Content-
    ID=<text.txt>) )
    Content-features: ( & (Type= "audio/amr")(media-size=5000) (Content-ID=<audio.amr>))
    Content-features: ( & (Type= "video/3gpp")(Duration=10000)(media-size=44000)(Content-
    subtype=video/h263-2000)(Profile=0)(level=10)(Frame-rate=15)(media-size=40000)(
    Content-subtype=audio/amr)(media-size=4000) (Content-ID=<video.3gpp>))
Message Body
    Content-type: application/smil
    Content-ID: <0000>
    .... SMIL presentation file....
    Content-type: image/jpeg
```

-continued

```
Content-ID: <image1.jpg>
.... jpeg-image....
Content-type: text/plain; charset="us-ascii"
Content-ID: <text.txt>
.... text....
Content-type: audio/amr
Content-ID: <audio.amr>
.... audio....
Content-type: video/3gpp
Content-ID: <video.3gp>
.... audio+video clip....
```

Note that it is possible to provide media characteristics in both the message header and body. If there is a contradiction between them, which should not normally happen, a method to resolve the conflict can be defined. For instance the message header information can be defined to have precedence since it is likely to be the only information used by a messaging server if present and complete (i.e., if complete, it would not even parse the message body).

Comparison of Media Characteristics with Terminal Capabilities

In order to determine if the message content is suitable for a given terminal, the media characteristics present in the message header or body must be compared with the terminal capabilities. The terminal capabilities can be obtained through a wide variety of methods including terminal capability databases, user terminal profile databases, and UAProf. For instance, Table 4 summarizes the attributes defined within the MMS Characteristics component in MMS v1.2. (See: "MMS v1.2 Client Transactions," Open Mobile Alliance (OMA), at http://www.openmobilealliance.org).

TABLE 4

Terminal attributes defined within the MMS Characteristics component in MMS v1.2.

| Attribute | Description | Resolution Rule | Type | Sample Values |
|---|---|---|---|---|
| Component: MMS Characteristics | | | | |
| MmsMaxMessageSize | The maximum size of a multimedia message in bytes. | Locked | Number | 20480 |
| MmsMaxImageResolution | The maximum size of an image in units of pixels (horizontal × vertical). | Locked | Literal | "80 × 60" |
| MmsCcppAccept | List of supported content types conveyed as MIME types. | Locked | Literal bag | "image/jpeg", "audio/wav", "video/mpeg-4" |
| MmsCcppAcceptCharSet | List of character sets that the MMS Client supports. Each item in the list is a character set name registered with IANA. | Locked | Literal bag | "US-ASCII", "ISO-8859-1" |
| MmsCcppAcceptLanguage | List of preferred languages. The first item in the list should be considered the user's first choice. Property value is a list of natural languages, where each item in the list is the name of a language as defined by RFC 1766. | Locked | Literal bag | "en", "fr" |
| MmsCcppAcceptEncoding | List of transfer encodings that the MMS Client supports. Property value is a list of transfer encodings, where each item in the list is a transfer encoding name as specified by RFC 2045 and registered with IANA. | Locked | Literal bag | "base64", "quoted-printable" |
| MmsVersion | The MMS versions supported by the MMS Client conveyed as majorVersionNumber.minorVersionNumber. | Locked | Literal bag | "2.0", "1.3" |
| MmsCcppStreamingCapable | Indicates whether the MMS Client is capable of invoking streaming. | Locked | Boolean | "Yes", "No" |
| MmsSmilBaseSet | Indicates one or more base sets of SMIL modules that the client supports. "SMIL-CONF-1-2" identifies the SMIL base set and associated limitations | Locked | Literal bag | "SMIL-CONF-1-2" |

TABLE 4-continued

Terminal attributes defined within the MMS Characteristics component in MMS v1.2.

| Attribute | Description | Resolution Rule | Type | Sample Values |
|---|---|---|---|---|
| | defined in MMS CONF (MMS Conformance document of the OMA MMS specifications v 1.2). Predefined values for base sets defined in3GPP TS 26.234 may also be used (e.g. SMIL-3GPP-R and SMIL-3GPP-R). | | | |
| X-Mms-Content-Class | List of supported MM Content Classes: TX = Text; IB = Image basic; IR = Image rich; VB = Video basic; and VR = Video rich; | Locked | Literal bag | "TX", "IB", "IR", "VB", "VR" |
| MmsSuppressContentAdaptation | Requests that MMS Proxy-Relay performs no content adaptation. | Locked | Boolean | "Yes", "No" |

The messaging server determines the need for adaptation by comparing the media characteristics with the terminal capabilities. Adaptation is required if: the media characteristics are not supported by the terminal (e.g. message size is too large or MMS message class not supported); or the message contains any component for which the MIME content-type is not supported by the terminal; or the message contains components for which the characteristics are not supported by the terminal and would cause interoperability problems (such as e.g. the resolution is too large for what the terminal can support, or the profile or level of the component is not supported, and so on).

Table 5 indicates how media characteristics and terminal capabilities can be compared in the case of an MMS terminal in order to determine whether transcoding (of an MMS message) is needed.

TABLE 5

Comparison of media characteristics and UAProf capabilities in MMS.

| Media characteristic | UAProf descriptor | Condition for the content to be suitable for the terminal |
|---|---|---|
| X-Mms-Content-Class | MmsContentClass | The intersection between X-Mms-Content-Class media characteristic and UAProf's MmsContentClass must be non-empty. |
| Media-size at message level | MmsMaxMessageSize | Media-size at message level must not exceed MmsMaxMessageSize. |
| Content-type, Content-subtype, Content-Description | MmsCcppAccept | All MIME type values of content-type, content-subtype and content-description must be element of MmsCcppAccept. |
| Media-pix-x and Media-pix-y | MmsMaxImageResolution | Media-pix-x by Media-pix-y must not exceed MmsMaxImageResolution. |
| Charset | MmsCcppAcceptCharSet | Charset value must be element of MmsCcppAcceptCharSet. |
| Content-Encoding | MmsCcppAcceptEncoding | Content-Encoding must be element of MmsCcppAcceptEncoding. |
| Profile (for application/smil) | MmsSmilBaseSet | Profile of an application/smil content-type must be element of MmsSmilBaseSet. |

Currently, MMS terminals do not report image and video relevant profiles/capabilities (such as JPEG baseline or progressive, H.263 profile and level). Thus, to implement the invention, MMS terminals need to be enhanced to provide such information so that the terminal capabilities can be compared with media characteristics as described above. In case of an MMS terminal not so enhanced, and when terminal capabilities are not otherwise available, the invention can be practised assuming that the most basic profile and level is supported by the terminal (e.g. JPEG baseline or H.263 Profile 0 level 10 if video is supported). But when available, profile and level information (or profile-level-id) should of course be compared.

Figure 3:
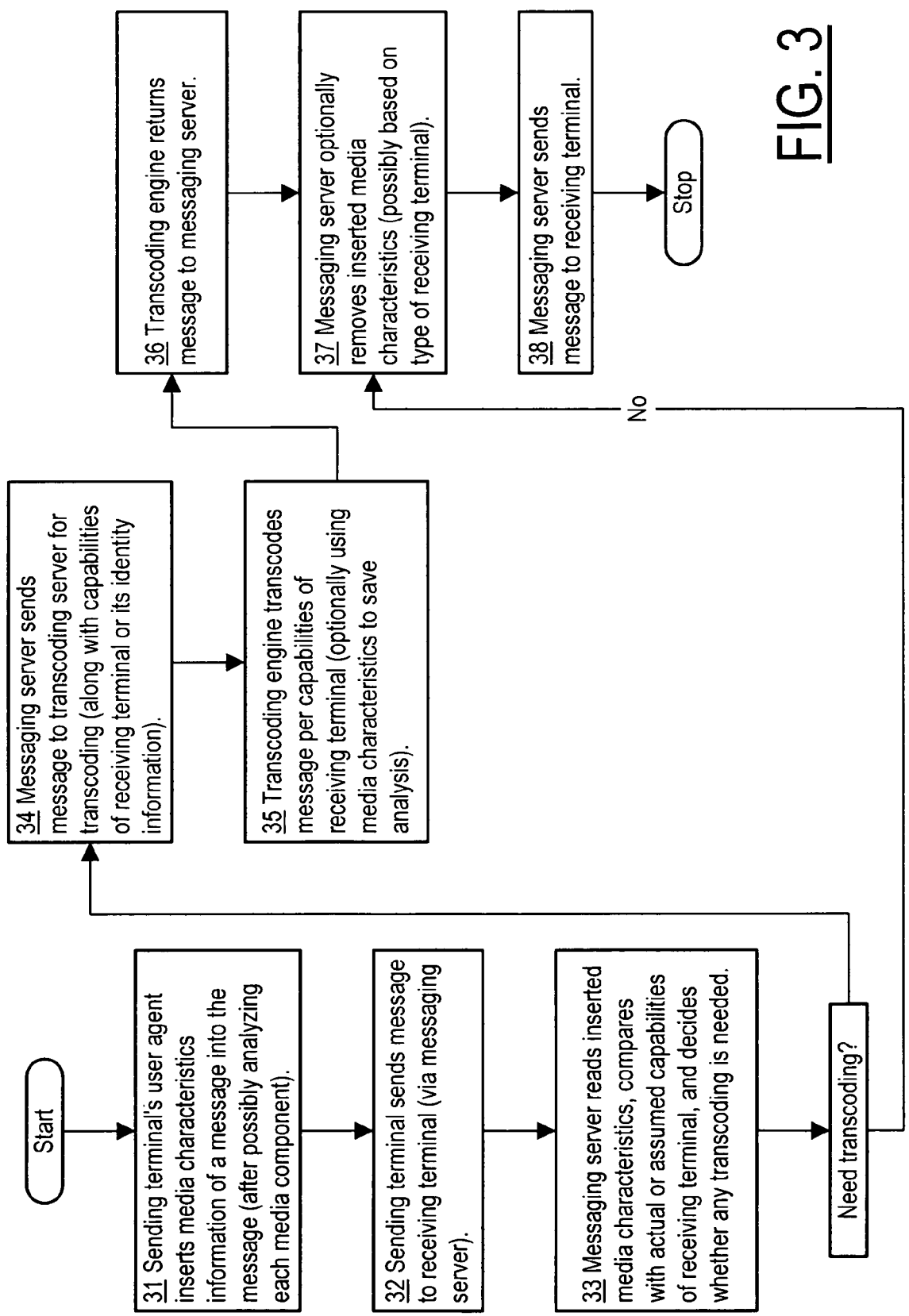
FIG. 3 is a flowchart showing the operation of a messaging system according to the invention.

Referring now to FIG. 3 (and still also to FIG. 2), the invention is shown as providing a method including a first step 31 in which the sending terminal's user agent 21a inserts media characteristics information in a message (after possibly analyzing each media component) intended for the receiving terminal 25. In a next step 32, the sending terminal 21 sends the message to the receiving terminal 25, with the result that the message arrives at the messaging server 22 en route to the receiving terminal. In a next step 33, the messaging server reads the inserted media characteristics, compares them with actual or assumed capabilities of the receiving terminal (actual being obtained e.g. by a look up), and decides whether there is a need for any transcoding. If transcoding is not needed, then in an optional next step 37, the messaging server removes the inserted media characteristics (possibly based on type of receiving terminal), and in a next step 38 the messaging server sends the message to the receiving terminal. If however transcoding is needed (according to the comparison made by the messaging server), then in a next step 34 the messaging server sends the message to the transcoding server 24 (assumed here to be external to the messaging server, but could also be hosted by messaging server) for transcoding (along with an indication of the capabilities of the receiving terminal or its identity information for use in possibly obtaining the capabilities of the receiving terminal, as explained above). In a next step 35 the transcoding engine hosted by the transcoding server transcodes the message based on the capabilities of the receiving terminal, possibly using the inserted media characteristics as a guide to what needs to be transcoded in order to save analysis. Then in a next step 36, the transcoding engine returns the message to messaging server. Then, optionally, the messaging server optionally performs step 37 in which it removes the inserted media characteristics. Finally, the messaging server sends the message to the receiving terminal (in step 38).

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code—i.e. the software or firmware—thereon for execution by a computer processor.

It is to be understood that the above-described arrangements are only illustrative of the application of the principles of the present invention. In particular, the invention applies to a wide range of messaging servers including MMS Proxy-relays, SIP messaging servers, e-mail servers, and others. Also, the terminals are not limited to wireless terminals but include PCs, PDAs, and other kinds of terminals able to be used for communication. Further, the term multimedia message should be understood to include any message containing multimedia content, including e.g. one or more of the following kinds of content: images, video, audio, and text, as well as other kinds of content. In addition, the transcoding server can be an external server to the messaging server or be an internal process handling transcoding within the messaging server. Finally, numerous modifications and alternative arrangements may be devised by those skilled in the art without departing from the scope of the present invention, and the appended claims are intended to cover such modifications and arrangements.

What is claimed is:

1. A messaging server, comprising a processor configured to:
    obtain media characteristics of a multimedia message that are inserted into the multimedia message intended for a receiving terminal, wherein the media characteristics of the multimedia message comprise at least one of the following: a number of frames, or a sampling rate of audio content, wherein the multimedia message has a header portion and a body portion, and the media characteristics of the multimedia message are inserted into a field in the header portion of the multimedia message;
    decide whether the multimedia message should be transcoded based only on comparing the media characteristics of the multimedia message with actual or assumed multimedia capabilities of the receiving terminal; and
    remove the media characteristics that are inserted into the multimedia message before sending the multimedia message to the receiving terminal when transcoding is not needed.

2. A messaging server as in claim 1, wherein the messaging server is further configured to transcode the multimedia message based on the inserted media characteristics and the actual or assumed multimedia capabilities of the receiving terminal, without performing an analysis of the multimedia message to determine media characteristics of the multimedia message relevant to deciding whether transcoding is needed.

3. A messaging server as in claim 1, wherein the messaging server is further configured to send the multimedia message to a transcoding server if transcoding is needed, and the transcoding server is configured to use the inserted media characteristics to decide if transcoding is needed.

4. A messaging server as in claim 1, wherein the messaging server is further configured to determine, from the inserted media characteristics, which parts of the multimedia message need transcoding and to send the multimedia message to a transcoding server if transcoding is needed for any message part, and to include in the multimedia message an indication of which parts of the multimedia message need transcoding.

5. The messaging server of claim 1, wherein the processor is further configured to remove the media characteristics from the multimedia media message after transcoding when transcoding is needed and before sending the multimedia message to the receiving terminal.

6. A method for use by a messaging server comprising:
    obtaining media characteristics of the multimedia message that are inserted into the multimedia message intended for a receiving terminal, wherein the media characteristics of the multimedia message comprise at least one of the following: a number of frames, a frame rate of visual content, or a sampling rate of audio content, wherein the multimedia message has a header portion and a body portion, and the media characteristics of the multimedia message are inserted into a field in the header portion of the multimedia message;
    deciding whether the multimedia message should be transcoded based only on a comparison of the inserted media characteristics and actual or assumed multimedia capabilities of the receiving terminal; and
    removing the media characteristics that are inserted into the multimedia message before sending the multimedia message to the receiving terminal when transcoding is not needed.

7. A computer program product comprising: a computer readable storage structure embodying computer program code thereon for execution by a computer processor in a messaging server, wherein said computer program code includes instructions for performing the method of claim 6.

8. The method of claim 6 further comprising removing the media characteristics from the multimedia media message after transcoding when transcoding is needed and before sending the multimedia message to the receiving terminal.

9. An apparatus for processing a multimedia message, the apparatus comprising a processor configured to:
    receive media characteristics of a media component of the multimedia message in a field of the multimedia message, wherein the media characteristics of the multimedia message comprise at least one of the following: a number of frames, or a sampling rate of audio content, wherein the multimedia message has a header portion and a body portion, and the media characteristics of the multimedia message are inserted into a field in the header portion of the multimedia message;

determine whether the multimedia message should be transcoded based at least in part on a comparison of the received media characteristics of the multimedia message and actual or assumed multimedia capabilities of a receiving terminal; and remove the media characteristics that are inserted into the multimedia message before sending the multimedia message to the receiving terminal when transcoding is not needed.

10. An apparatus as in claim 9, wherein the processor is further configured to:

determine media components of the multimedia message which need transcoding based at least on the respective received media characteristics; and transmit at least a part of the multimedia message to a transcoding server.

11. An apparatus as in claim 9, wherein the processor is further configured to:

transcode a media component of the multimedia message based at least on the actual or assumed multimedia capabilities of the receiving terminal.

12. The apparatus of claim 9, wherein the processor is further configured to remove the media characteristics from the multimedia media message after transcoding when transcoding is needed and before sending the multimedia message to the receiving terminal.

13. A method for processing a multimedia message, the method comprising:

receiving media characteristics of a media component of the multimedia message in a field of the multimedia message, wherein the media characteristics of the multimedia message comprise at least one of the following: a number of frames, or a sampling rate of audio content, wherein the multimedia message has a header portion and a body portion, and the media characteristics of the multimedia message are inserted into a field in the header portion of the multimedia message;

determining whether the multimedia message should be transcoded based at least in part on a comparison of the received media characteristics of the multimedia message and actual or assumed multimedia capabilities of a receiving terminal; and removing the media characteristics that are inserted into the multimedia message before sending the multimedia message to the receiving terminal when transcoding is not needed.

14. A method as in claim 10, further comprising:

determining which media components of the multimedia message need transcoding based at least on the respective received media characteristics; and transmitting to a transcoding server at least the media components of the multimedia message that need transcoding.

15. A method as in claim 10, further comprising:

transcoding a media component of the multimedia message based at least on the actual or assumed multimedia capabilities of the receiving terminal.

16. The method of claim 13 further comprising removing the media characteristics from the multimedia media message after transcoding when transcoding is needed and before sending the multimedia message to the receiving terminal.

* * * * *